(12) United States Patent
Hammar

(10) Patent No.: US 7,744,334 B2
(45) Date of Patent: Jun. 29, 2010

(54) GOOSENECK SEMI-TRAILER

(76) Inventor: Bengt-Olof Hammar, SE-517 95, Olsfors (SE)

( * ) Notice: Subject to any disclaimer, the term of this patent is extended or adjusted under 35 U.S.C. 154(b) by 671 days.

(21) Appl. No.: 11/604,231

(22) Filed: Nov. 27, 2006

(65) Prior Publication Data

US 2007/0140818 A1 Jun. 21, 2007

(30) Foreign Application Priority Data

Dec. 6, 2005 (SE) .................................... 0502691

(51) Int. Cl.
*B60P 1/64* (2006.01)
(52) U.S. Cl. ...................................... 414/546
(58) Field of Classification Search ................ 414/470, 414/475, 542, 341, 513, 546, 555
See application file for complete search history.

(56) References Cited

U.S. PATENT DOCUMENTS

| | | | | |
|---|---|---|---|---|
| 2,857,062 | A * | 10/1958 | Anderson | ................... 414/543 |
| 3,235,105 | A * | 2/1966 | Loomis | ..................... 414/544 |
| 4,613,276 | A * | 9/1986 | Blatchford | ................. 414/542 |
| 4,624,225 | A * | 11/1986 | Kowal | .................... 123/90.58 |
| 4,721,431 | A * | 1/1988 | Ostermeyer | ................ 414/542 |
| 5,088,875 | A * | 2/1992 | Galbreath et al. | ........... 414/478 |
| 2007/0154295 | A1 * | 7/2007 | Kuriakose | ................... 414/546 |

FOREIGN PATENT DOCUMENTS

| | | |
|---|---|---|
| DE | 9306626 | 7/1993 |
| GB | 2236518 | 4/1991 |
| GB | 2340796 | 3/2000 |
| WO | WO 91/14597 | 10/1991 |

OTHER PUBLICATIONS

Search Report dated Aug. 16, 2007 for corresponding European Application No. 06123367.2.

* cited by examiner

*Primary Examiner*—Charles A Fox
(74) *Attorney, Agent, or Firm*—Harness, Dickey & Pierce, P.L.C.

(57) ABSTRACT

The present invention relates to a semi-trailer, comprising a gooseneck chassis and a container lifting device with at least one crane part displaceable along the chassis. The chassis comprises frame portions which are vertically displaced relative to each other, where the available vertical space for driving the displaceable crane part is limited particularly in the transition between said frame portions. The displacement of the crane part on one frame portion of the chassis takes place by means of a linearly operating, longitudinally variable elongate actuator, which both in the retracted and in the extended state is positioned substantially within the height limits of the chassis and has a substantially constant angle to the chassis. A vertically articulated link arm is at one end connected to a driving part of the actuator and at the other end articulated to said displaceable crane part.

10 Claims, 4 Drawing Sheets

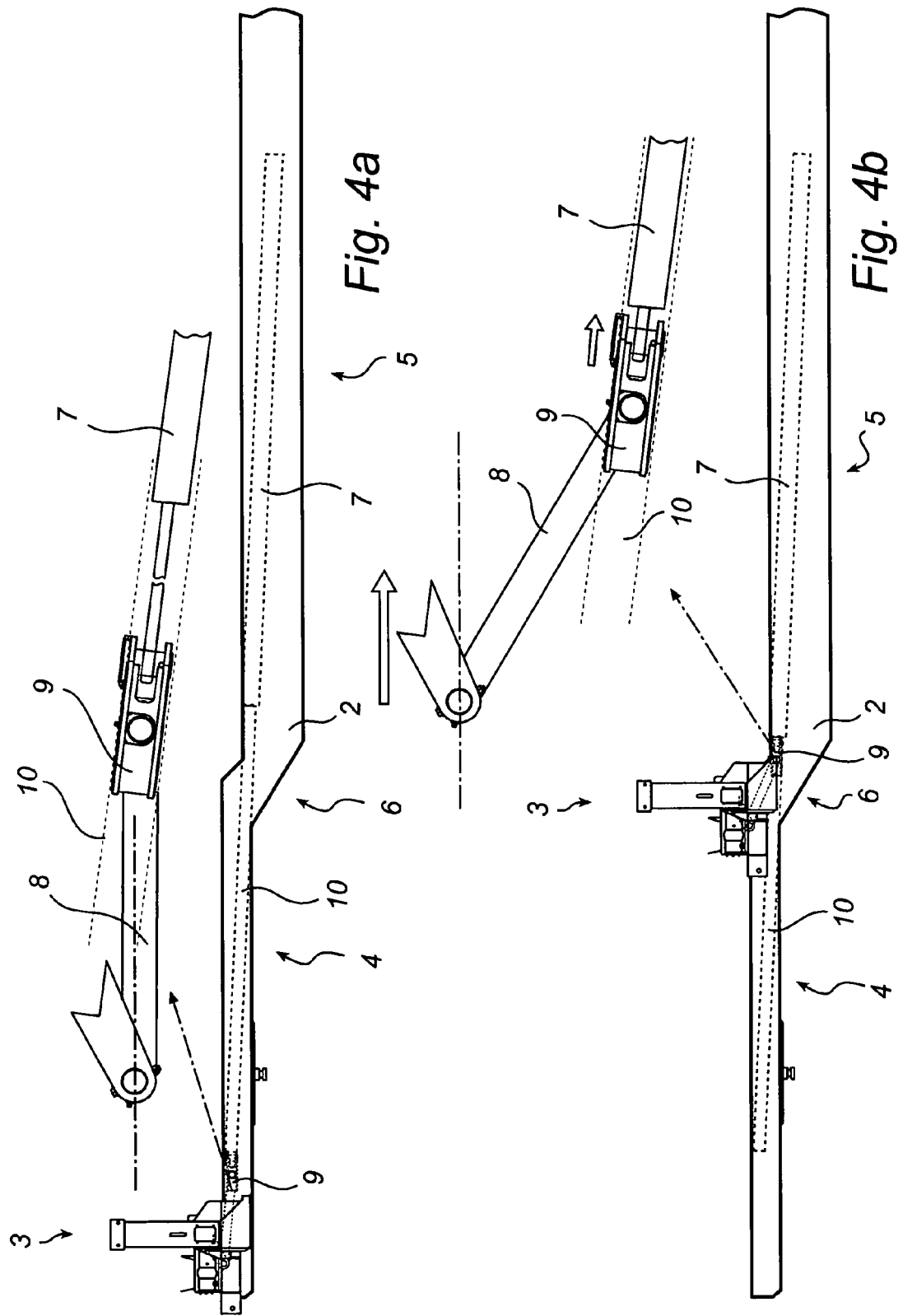

US 7,744,334 B2

GOOSENECK SEMI-TRAILER

PRIORITY STATEMENT

This application claims benefit of priority under 35 U.S.C. §119 from Swedish Patent Application No. SE 0502691-9 filed on Dec. 6, 2005, in the Swedish Patent Office, the disclosure of which is incorporated herein by reference in its entirety.

FIELD OF THE INVENTION

The present invention relates to a semi-trailer for transporting containers which is connected to a tractor unit, comprising a gooseneck chassis and a container lifting device with at least one crane part displaceable along the chassis. The chassis comprises frame portions which are vertically displaced relative to each other and the space available in the vertical direction for driving the displaceable crane part is limited especially in the transition between said frame portions.

BACKGROUND ART

Different sizes of containers are available on the market, for example with different lengths and heights. When transporting containers using a tractor unit or truck and a semi-trailer, it is desirable to be able to load the containers onto the semi-trailers and unload them therefrom by means of a lifting device of the same. However, it is difficult to transport different combinations and sizes of containers on one and the same semi-trailer and at the same time provide a lifting device for all different combinations and sizes of containers within the scope of statutory dimensions of truck and trailer combinations. Besides there are different container dimensions and statutory dimensions of container transports in different countries. Prior art technique offers solutions to move the container lifting device on a semi-trailer, using, for instance, gear racks, hydraulic motors, chains, and horizontally arranged hydraulic cylinders, but these solutions are sensitive to dirt and expensive and/or have an unreliable function.

SUMMARY OF THE INVENTION

An object of the present invention is to provide an improved semi-trailer for transporting containers, which can transport and load/unload different combinations and sizes of containers and, thus, achieve good flexibility and profitability for the transport.

Another object of the present invention is to provide a reliable construction for displacing a crane part along the chassis of the semi-trailer to be able to load/unload containers of different sizes.

The above objects and other objects that will be evident from the following description are achieved by a device according to the appended claims.

The invention is based on the knowledge that it is possible to provide a linear motion which is angled to a driving hydraulic cylinder without applying lateral forces to the hydraulic cylinder.

According to one aspect of the invention, a semi-trailer for transporting containers is described, which is connected to a tractor unit, comprising a gooseneck chassis and a container lifting device with at least one crane part displaceable along the chassis. The chassis comprises frame portions which are vertically displaced relative to each other and the space available in the vertical direction for driving the displaceable crane part is limited especially in the transition between said frame portions. The displacement of the crane part on one frame portion of the chassis takes place by means of a linearly operating, longitudinally variable elongate actuator, which both in the retracted and in the extended state is positioned substantially within the height limits of the chassis and has a substantially constant angle to the chassis. A vertically articulated link arm is at one end connected to a driving part of the actuator and at the other articulated to said displaceable crane part. The vertically displaced frame portions make it possible to transport different sizes and combinations of containers. Moreover the geometry of the chassis is restricted by statutory requirements, the location of the fifth wheel, the size of the wheels etc., which means that there is only a limited space for driving the displaceable crane part. In order to accommodate an elongate actuator with a desirable length of stroke, the driving device must pass the transition between the frame portions. To prevent the actuator from being subjected to lateral forces or moving outside the allowed geometry, the invention uses a link arm which increases the possible horizontal length of stroke of the actuator that is used to displace the crane part along the higher portion of the chassis.

Preferably, the end of the link arm which is connected to the actuator slides by means of a slider along a guide, which is substantially parallel to the elongate actuator. The guide takes up lateral forces and, thus, relieves the actuator. The slider which is attached to the movable part of the actuator slides along the guide and thus affects the movement of the link arm. Since the link arm can be angled to the direction of the guide, no part of the driving device will be positioned outside the allowed geometry.

Advantageously the guide consists of a guide means and said slider consists of a slide which slides along the slidingly guiding guide means. This results in a simple and robust construction with a small risk of malfunction.

In a preferred embodiment, the guide consists of two U sections with their openings facing each other, the slider extending into the U sections. This results in a protected and reliable construction.

Preferably, the link arm is vertically articulate at both ends. The vertical articulation makes it possible to optimise the horizontal movement of the crane part which is performed by means of the actuator which is angled to the horizontal plane. Since the angle of the link arm in the fully extended position of the actuator does not coincide with the direction of the actuator and the guide, it is possible to prevent the construction from extending outside the allowed area.

In a preferred embodiment, the actuator consists of a hydraulic cylinder assembly. Driving can certainly be performed in various ways, but it has been found that a hydraulic cylinder assembly is preferred in several aspects. For example, an existing hydraulic system is utilised and a robust and relatively inexpensive construction is obtained.

Preferably, the driving/movable part of the actuator is connected to said slider which is connected to one end of the link arm via a horizontal shaft which provides vertical articulation. The slider can be integrated with the movable part of the actuator or alternatively rigidly connected thereto, but if standard components can be used, this is preferred from the viewpoint of cost. The articulated connection between slider and link arm promotes the vertical articulation of the link arm.

Preferably the actuator is angled to the horizontal plane. Such angling makes it possible for an elongate actuator with a great length of stroke to pass the transition between the frame portions of the chassis.

Advantageously the guide passes diagonally, at an angle to the horizontal plane, through the transition between said frame portions. This angle is adjusted, together with the length of the link arm, to achieve optimal motion geometry of the driving device.

Preferably the link arm constitutes a spacer between the driving part of the actuator and said displaceable crane part. As mentioned above, this spacer helps to increase the possible length of movement of the crane part.

BRIEF DESCRIPTION OF THE DRAWINGS

The invention will in the following be described in more detail with reference to the accompanying drawings which by way of example illustrate currently preferred embodiments of the invention.

FIGS. 4a-b are a side view of the chassis with a front crane part and a view of an enlarged part of the displacing mechanism.

DESCRIPTION OF PREFERRED EMBODIMENTS

Figure 1:
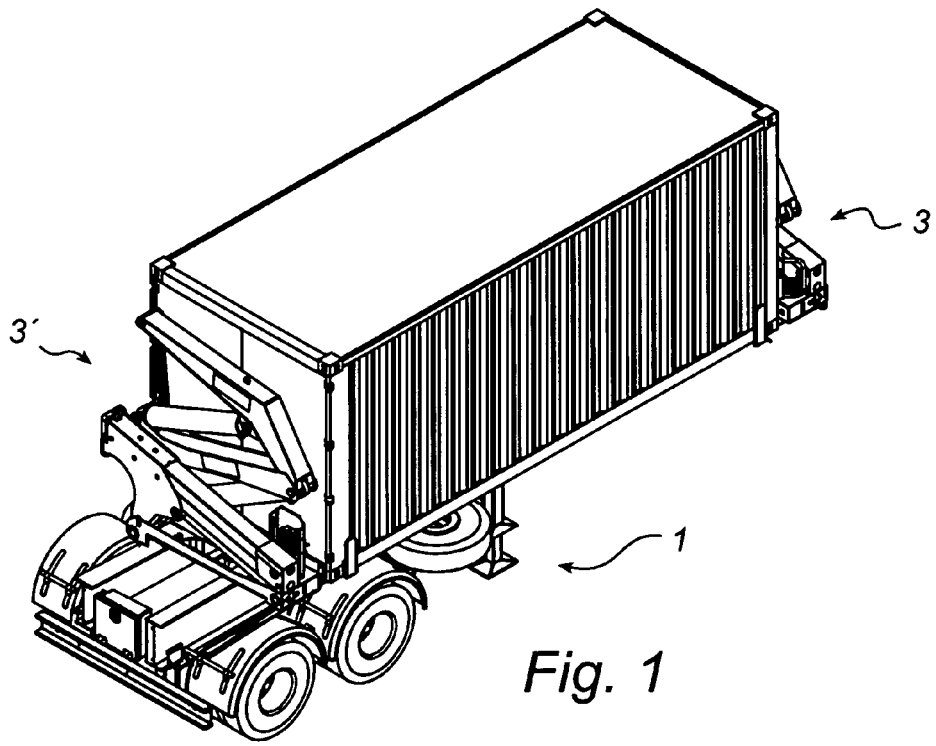
FIG. 1 is a perspective view of a semi-trailer for transporting containers.

With the described type of container semi-trailers, the container is loaded/unloaded transversely to the longitudinal direction of the semi-trailer 1 and the container remains substantially horizontal during the entire loading/unloading operation. The container is raised by means of a crane part 3, 3' at each short side of the container.

In the shown embodiment, the chassis 2 of the semi-trailer has a rear portion 5 with a lower level and a front portion 4 with a higher level which is shorter than the rear portion. These portions are limited in the vertical direction upwards by the containers and by the maximum height of the vehicle, the front portion is limited downwards by the traction unit and the fifth wheel, while the rear portion is limited downwards by the wheels. At least these limitations provide a limited space for the transition 6 between the two portions 4, 5. It is desirable to be able to move the front crane part 3 from the front end of the high portion 4 to the rear end, that is along the entire high portion. To perform this with a hydraulic cylinder 7, a relatively long length of stroke is required to pass the limited area of the transition 6 between the two portions.

In contrast to the front crane part 3, it is possible to displace the rear crane part 3' using a horizontally arranged hydraulic cylinder since the rear portion 5 is longer and allows a greater space for a displacing device and, in addition, it is usually not necessary to move the rear crane part 3' along the entire rear portion.

Since a hydraulic cylinder 7 with a desired length of stroke cannot pass the limited area without projecting from the allowed limitations, use is made of a link arm 8, together with a hydraulic cylinder 7 with a shorter length of stroke, so as to keep within the limitations. The available space is used by combining an angled positioning of the hydraulic cylinder 7 with the length of stroke so that it will be possible to provide the desired horizontal displacement of the front crane part 3 by connecting a vertically articulated link arm 8 between the end of the piston rod of the hydraulic cylinder and the front crane part.

When the front crane part 3 is in its rear position, the link arm 8 is oriented in an angled manner approximately at an angle upwards to the hydraulic cylinder 7. Since the crane part 3 slides horizontally along the chassis 2 and the hydraulic cylinder 7 performs a linear motion, the link arm 8 will successively change its angle so that, when the crane part 3 is in its front position, the link arm 8 will be angled with the front end downwards relative to the hydraulic cylinder 7. In this way, the vertical extent of the construction decreases, resulting in an increased horizontal length of stroke with the given available space. When the hydraulic cylinder 7 is in its fully extended position, it is located within the lateral profile of the chassis, and the remaining distance from the piston rod to the front end position of the crane part 3 is taken up by the link arm 8.

To control the motions and prevent the hydraulic cylinder from being subjected to loads transversely to its longitudinal direction, a guide 10 is arranged parallel to and in the extension of the hydraulic cylinder 7, so that the end of the piston rod, together with the rear end of the link arm 8, can follow the guide 10 by means of a slider 9. The guide 10, which consists of two U sections attached to the chassis 2, passes the transition 6 between the two portions of the chassis. Due to the slider 9 sliding with low friction, for instance with a surface of stainless steel against a lubricated steel surface, no particular lateral forces will arise that would be a strain on the hydraulic cylinder 7 and its packings, resulting in a reduced life or requiring a higher degree of maintenance. In an alternative embodiment (not shown) the guide/slider can be formed as a rail and a rolling slider or involving alternative construction solutions for guide and slider; for instance, the slider may slide on or inside a guiding rail.

Since the link arm 8 is articulated at both ends, it can only absorb compressive/tractive forces, and the lateral forces that arise due to the angular difference between the hydraulic cylinder 7 and the horizontal movement of the crane part 3 are taken up by the guide 10 for the guide means and by the horizontal path of the crane part.

In the preferred embodiment, the guide 10 for the slider 9 consists of two U beams which face each other and extend obliquely through the transition 6 between the two portions 4, 5 of the chassis and forwards so as to end at the upper edge of the front portion 4 of the chassis. The slider 9 consists of a construction with four sliding surfaces against each inside of the webs of the U beams; moreover the slider has a cylindrical pin for fixing the piston rod of the hydraulic cylinder 7 and a cylindrical pin which constitutes the hinge between the slider 9 and the link arm 8. As mentioned above, both the guide 10 and the slider 9 may be designed in alternative ways.

Figure 2A:
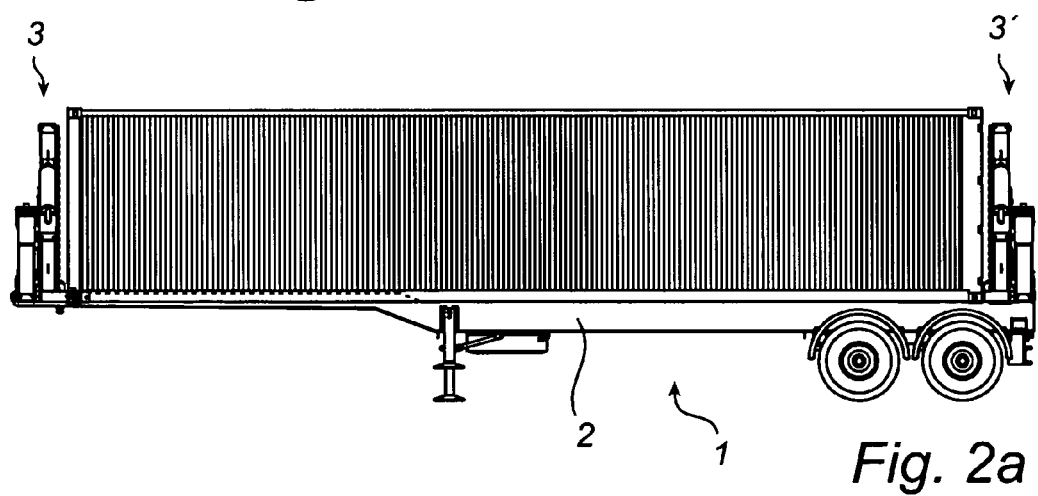
FIG. 2 is a side view of a semi-trailer with a 40 foot container.
FIG. 2b is a side view of a semi-trailer with a 20 foot container.
Figure 2B:
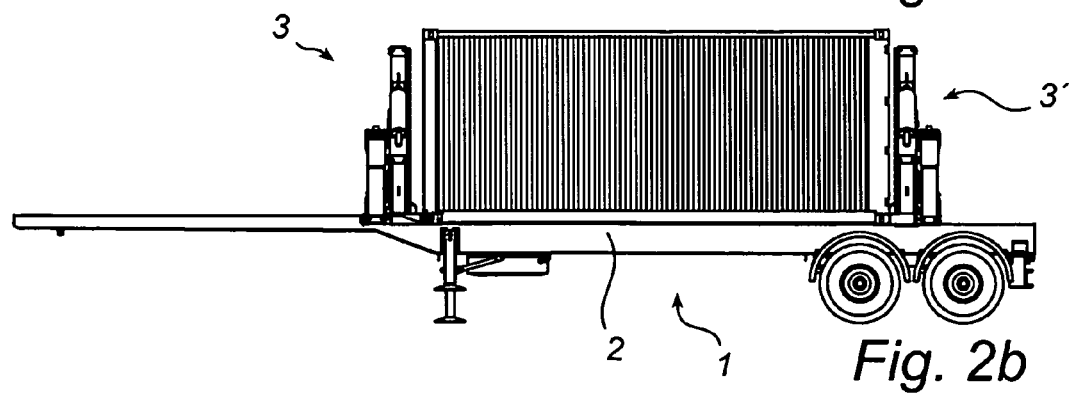
Figure 3A:
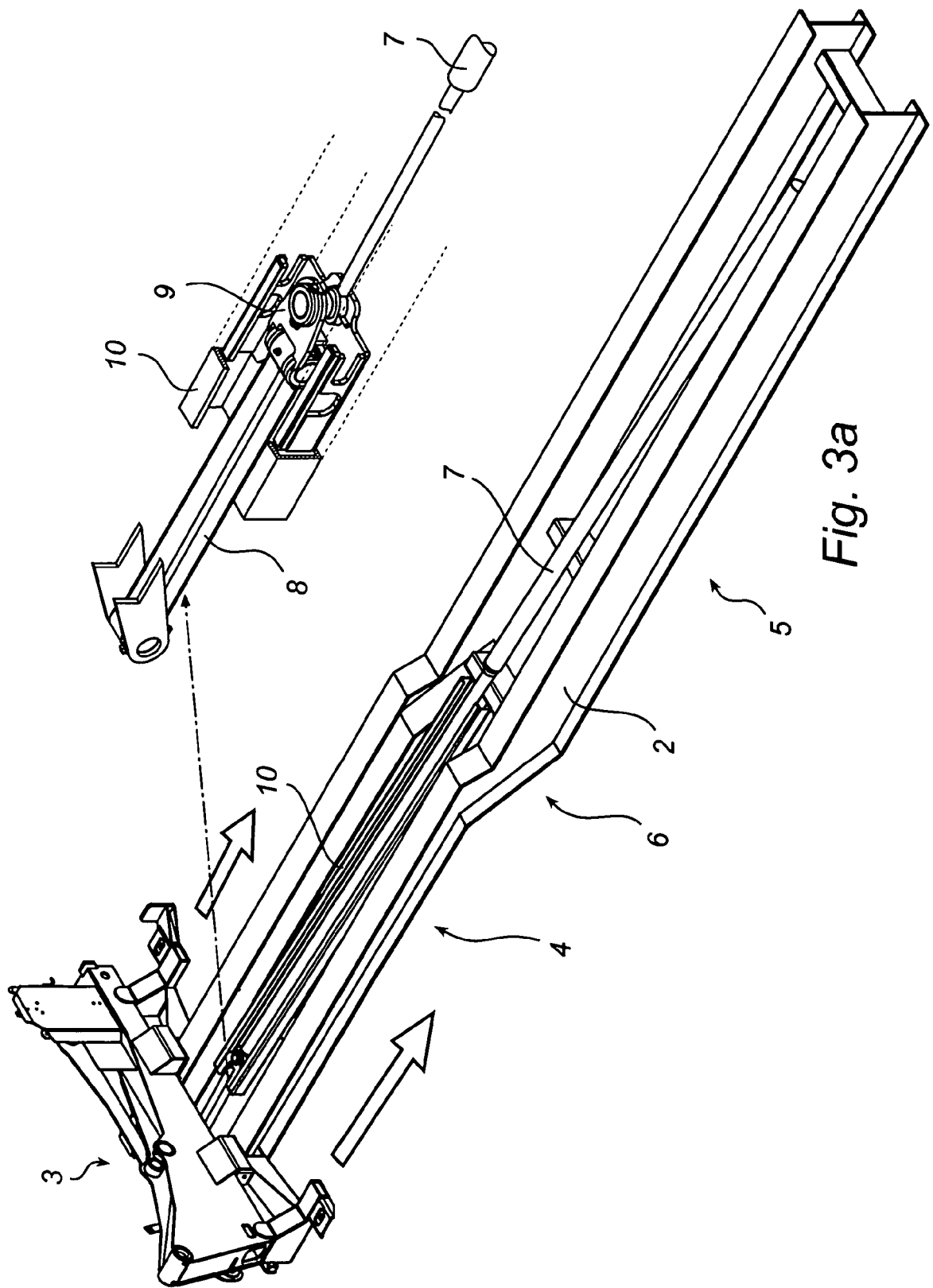
FIG. 3a is a perspective view of the chassis with a front crane part in its front position.
Figure 3B:
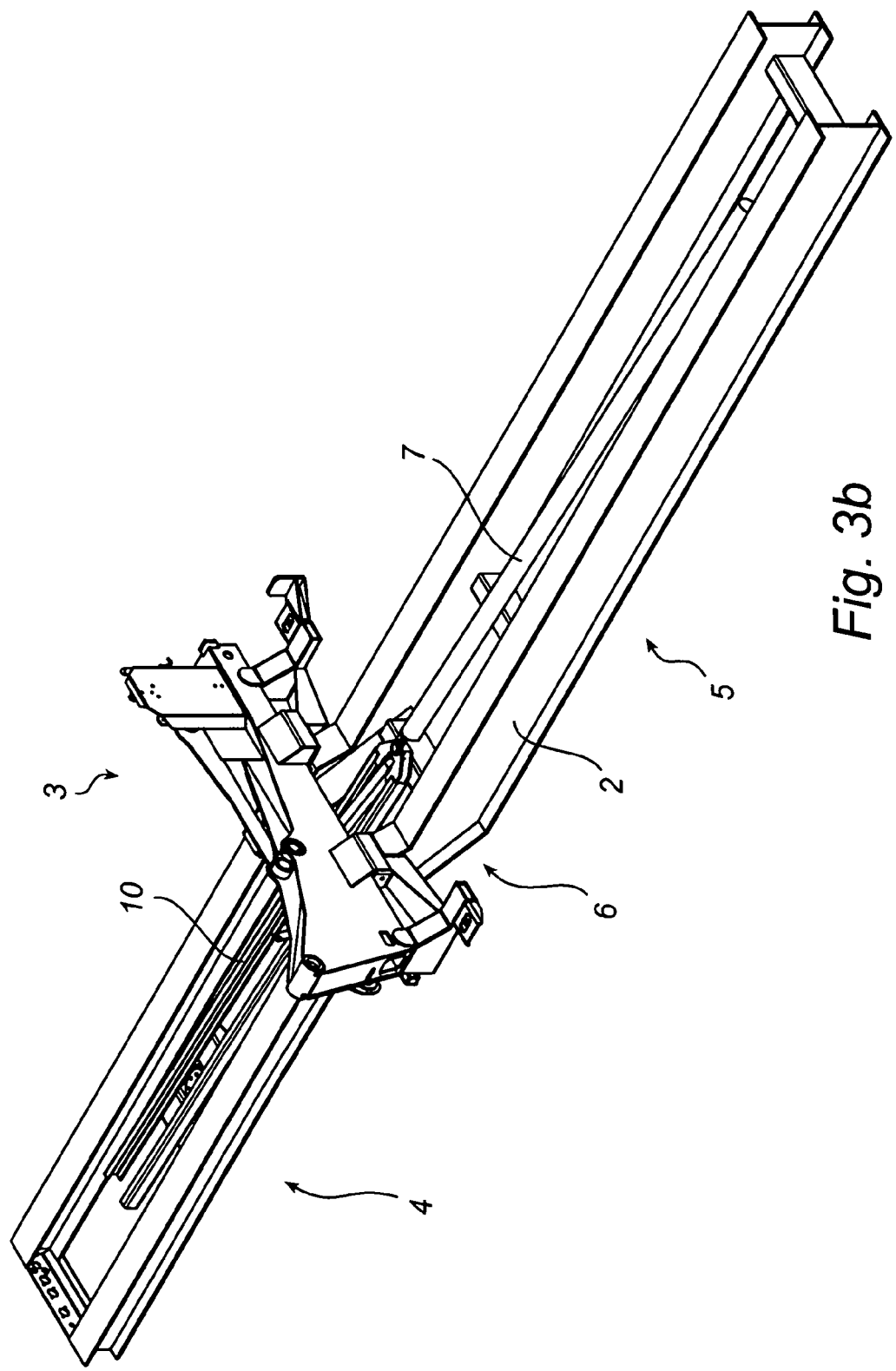
FIG. 3b is a perspective view of the chassis with a front crane part in its rear position.

As shown in FIG. 2a, a 40 foot container can be loaded onto a semi-trailer according to the invention; containers with a recess on the underside are well suited since the semi-trailer is designed so that the front portion 4 fits into the recess of the container. Thus, the total height of the load corresponds to the sum of the height of the rear portion of the semi-trailer and the height of the container. Furthermore a 20 foot container can be loaded as shown in FIG. 2b, that is the container rests at the lower level of the rear portion 5 and its front end is positioned adjacent to the transition 6. With a 20 foot container positioned in this way, the front crane part 3 is displaced to its rear end position, and the rear crane part 3' is displaced forwards so that the two crane parts 3, 3' can be used together to handle the container. It is also possible to load two 20 foot containers in succession onto the semi-trailer. With a semi-trailer according to the invention, it is thus possible to use a lower level 5 and the level of the front portion 4 for loading containers and, thus, use the semi-trailer in an all-round manner.

The invention claimed is:

1. A semi-trailer for transporting containers which are connected to a tractor unit, comprising a goose-neck chassis and a container lifting device with a forward crane part and a rearward crane part each of which are displaceable along the goose-neck chassis, the goose-neck chassis comprising two chassis portions positioned one behind the other, each having a top portion, whereby said top portions are positioned vertically displaced relative to each other, wherein one of the crane parts is connected to a linearly operating, longitudinally variable elongate actuator, and a displacement of the crane part connected to the elongate actuator takes place by means of the linearly operating, longitudinally variable elongate actuator, which both in a retracted and in an extended state is positioned substantially below said top portions and has a substantially constant angle to the goose-neck chassis, a vertically pivotable link arm being connected at one end to a driving part of the elongate actuator and at an other end pivotably connected to said crane part connected to the elongate actuator.

2. A semi-trailer as claimed in claim 1, wherein said end of the link arm which is connected to the elongate actuator slides with a slider along a guide, which is substantially parallel to the elongate actuator.

3. A semi-trailer as claimed in claim 2, wherein said guide includes two U sections with their openings facing each other, the slider extending into the U sections.

4. A semi-trailer as claimed in claim 1, wherein the link arm is vertically articulate at both ends.

5. A semi-trailer as claimed in claim 1, wherein said elongate actuator is a hydraulic cylinder assembly.

6. A semi-trailer as claimed in claim 1, wherein the driving part of the elongate actuator is connected to a slider which is connected to one end of the link arm.

7. A semi-trailer as claimed in claim 1, wherein said elongate actuator is angled to the horizontal plane.

8. A semi-trailer as claimed in claim 1, further comprising:
a guide passing diagonally, at an angle to a horizontal plane, through the transition between said chassis portions.

9. A semi-trailer as claimed in claim 1, wherein said link arm is a spacer between the driving part of the elongate actuator and said displaceable crane part.

10. A semi-trailer comprising:
a goose-neck chassis including,
a front portion with a first top surface,
a rear portion with a second top surface lower than the first top surface, and
a transition portion between the front portion and the rear portion, the transition portion connecting the front portion to the rear portion;
a crane including
a movable front crane configured to move along the front portion, and
a movable rear crane configured to move along the rear portion; and
a linear actuator connected to the movable front crane and the rear portion of the chassis, the linear actuator configured to move the movable front crane along the first top surface.

* * * * *